July 31, 1951 H. O. KRON 2,562,278
OVERLOAD LIMITING APPARATUS
Filed Oct. 12, 1949 6 Sheets-Sheet 1

Fig. I.

INVENTOR
Harold O. Kron
BY
Arthur Middleton
ATTORNEY

July 31, 1951  H. O. KRON  2,562,278
OVERLOAD LIMITING APPARATUS
Filed Oct. 12, 1949  6 Sheets-Sheet 2
Fig. 2.
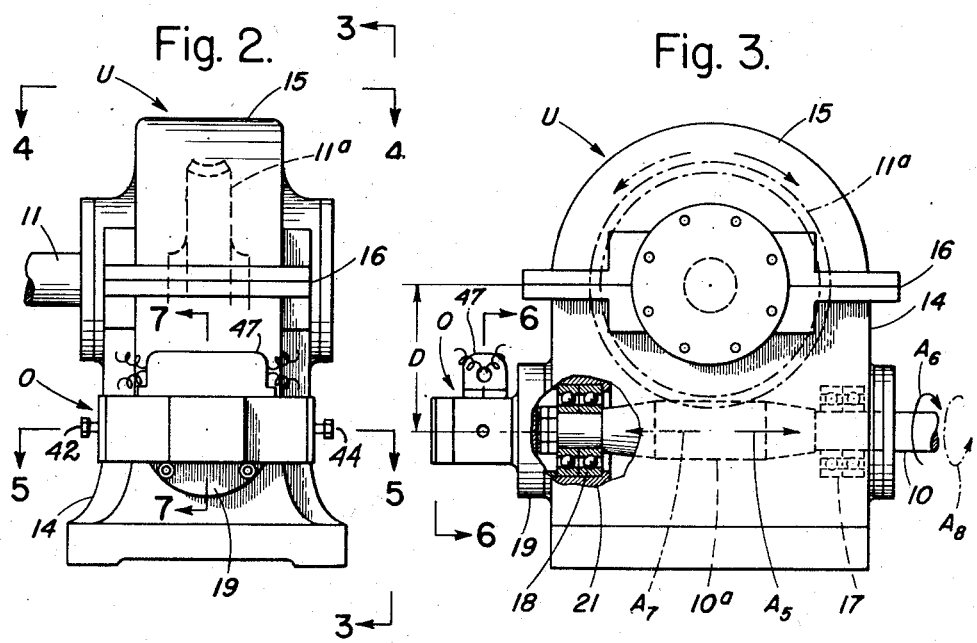
Fig. 3.
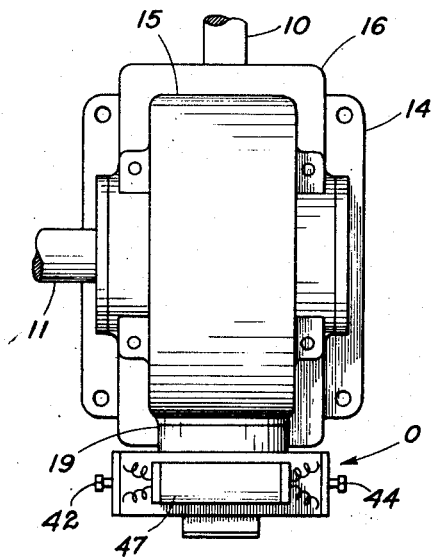
Fig. 4.
INVENTOR
Harold O. Kron
BY
Arthur Middleton
ATTORNEY

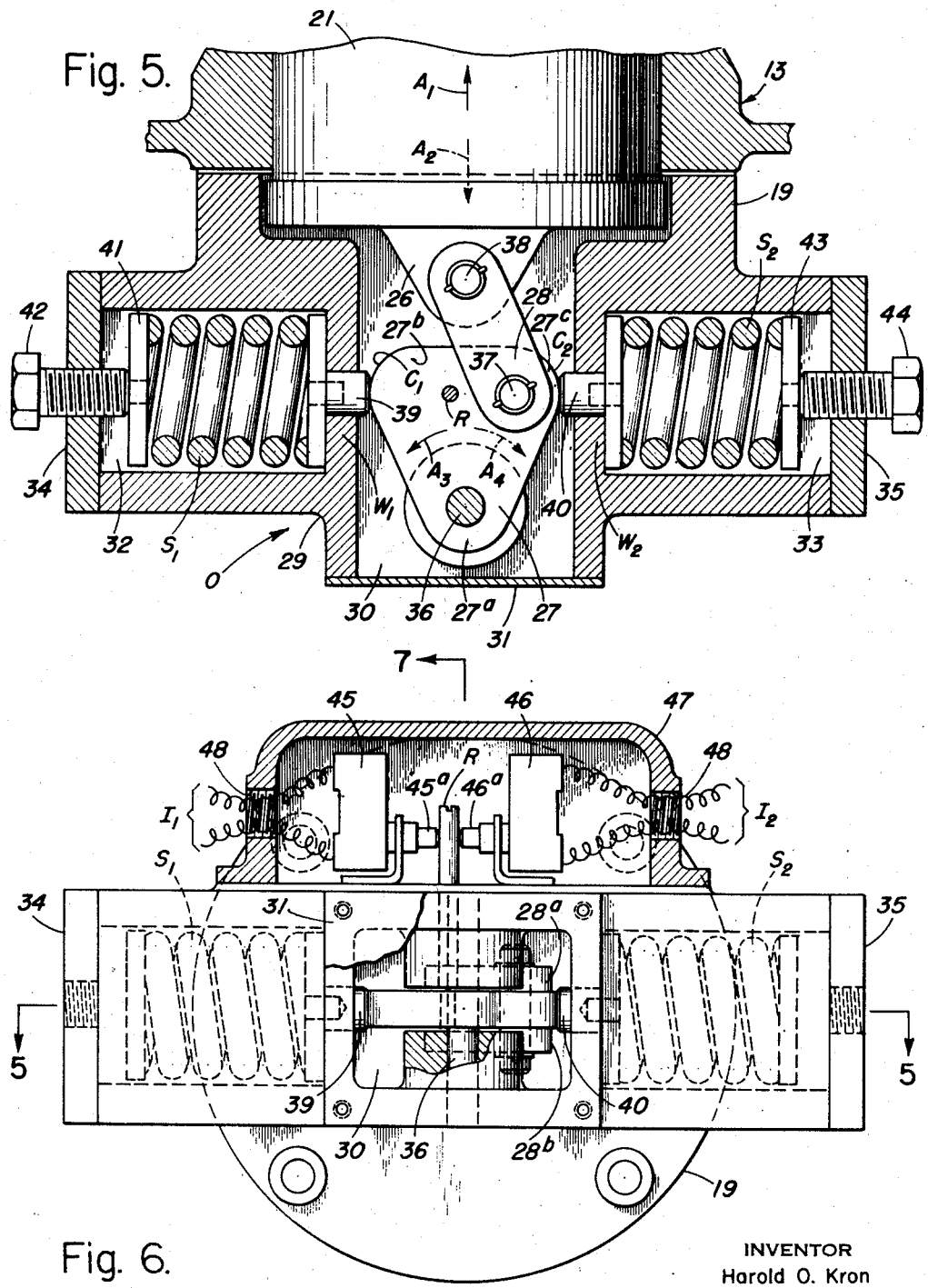

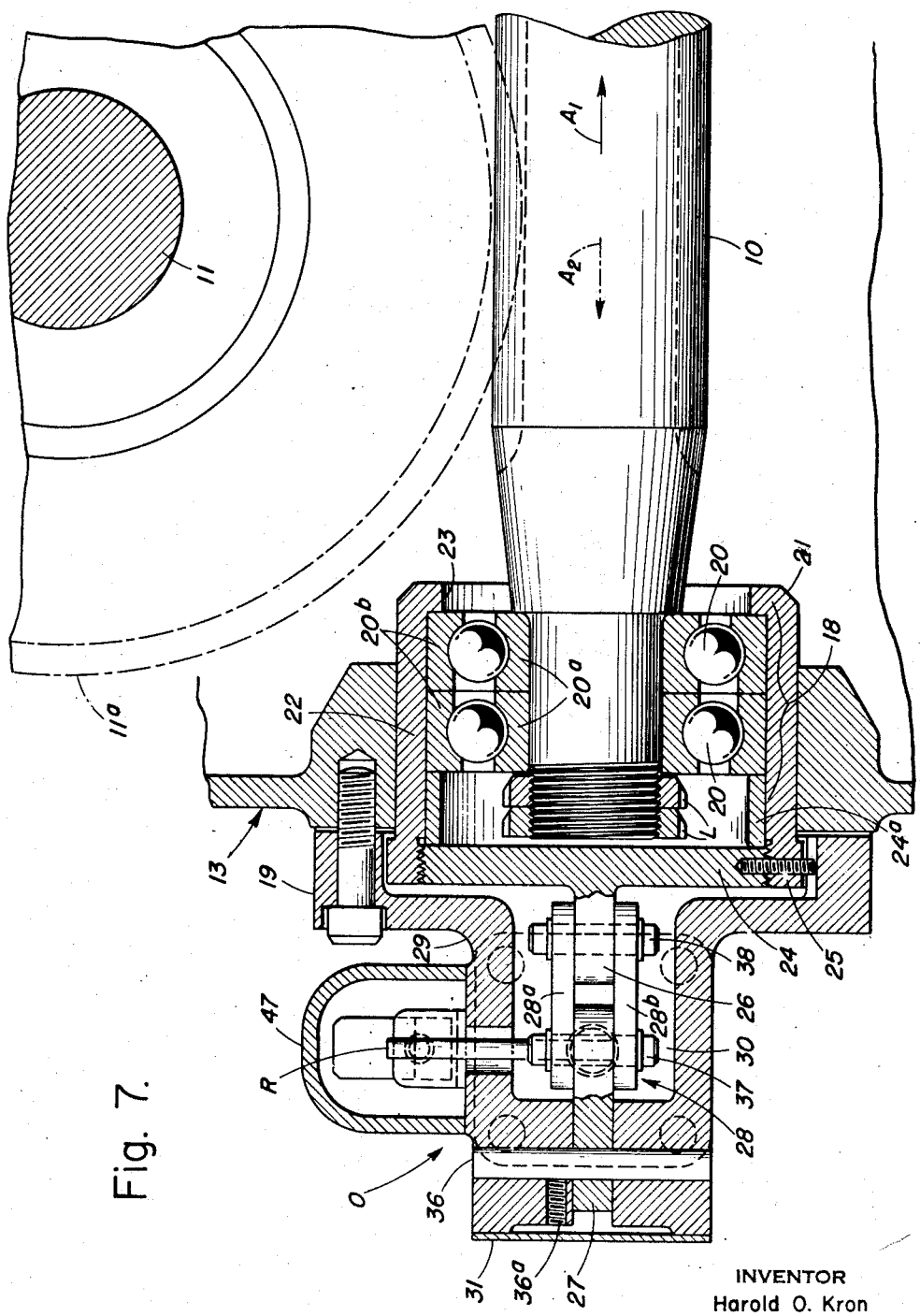

July 31, 1951 H. O. KRON 2,562,278
OVERLOAD LIMITING APPARATUS
Filed Oct. 12, 1949 6 Sheets-Sheet 5
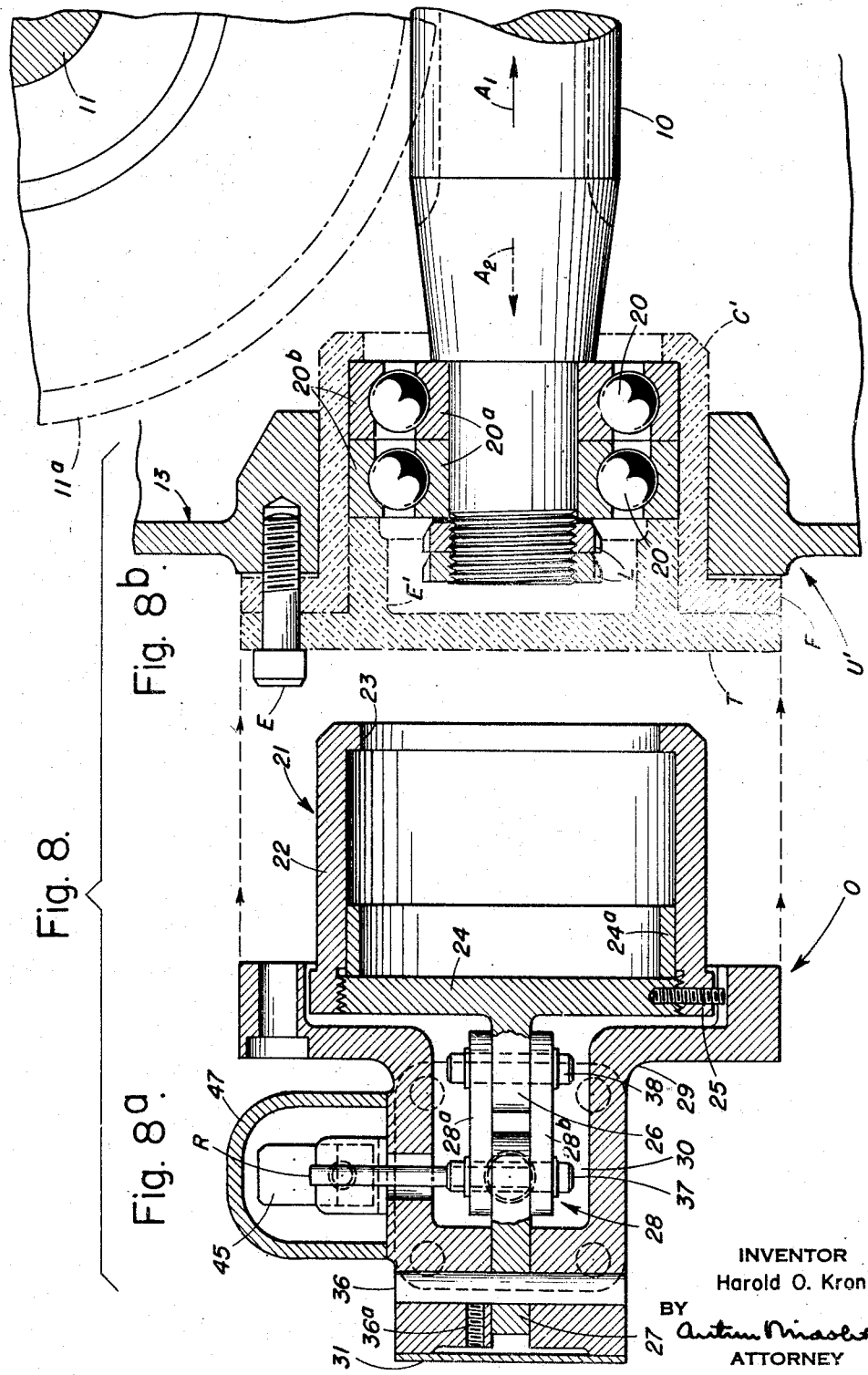

July 31, 1951 H. O. KRON 2,562,278
OVERLOAD LIMITING APPARATUS
Filed Oct. 12, 1949 6 Sheets-Sheet 6

INVENTOR
Harold O. Kron
BY
Arthur Middleton
ATTORNEY

Patented July 31, 1951

2,562,278

UNITED STATES PATENT OFFICE 2,562,278

OVERLOAD LIMITING APPARATUS

Harold O. Kron, Philadelphia, Pa., assignor to Philadelphia Gear Works, Inc., Philadelphia, Pa., a corporation of Pennsylvania Application October 12, 1949, Serial No. 121,000

13 Claims. (Cl. 318—475)

This invention relates to torque- or load-limiting devices for motor-driven speed reducers and more particularly for worm-gear reducers which comprise as gear elements a worm meshing with a worm gear, especially wherein axial thrust of the worm due to overload encountered by the worm-gear is utilized to cut off the motor that drives the worm.

A main object is to provide a load-limiting device for such reducers that is responsive to torque overload in either direction; that is compact, simple, and rugged; that is readily adjustable to whatever overload it should respond to; and that affords ready observation of its moving parts.

A more limited object is to provide a load-limiting device having these qualifications yet which is readily attachable to standard worm-gear reducers so that such reducers are readily convertible into overload-responsive units.

Such a reducer presents outwardly a housing from which extends the input end of the worm-shaft to which motive power is imparted, while the opposite end of this shaft terminates within the housing and is usually supported by a combination journal and axial thrust-bearing with such combination bearing mounted in the wall of the housing and absorbing the axial thrust of the worm-shaft without yielding while being outwardly removable therefrom by removal of a closure plate.

In one such standard reducer, the construction of the bearing comprises a cage surrounding and carrying the races of a combination thrust and radial bearing, and has an outer end flange attached to the housing. A closure plate fixedly closes the outer open end of this cage and absorbs axial thrust while the cage absorbs transverse radial-bearing pressure.

The objects of this invention are attained by attaching to the gear-housing in place of the fixed thrust-receiving closure plate and cage, a thrust-responsive unit presenting outwardly a supplemental or auxiliary casing for the housing that contains a device for yieldably absorbing excessive thrust due to overload of the worm-shaft in both directions by allowing the bearing to yield or slide against suitably adjusted spring pressure and through which axial shifting movement actuates switch or circuit-breaking means supported from the housing for stopping the motor in case of overload.

More in particular, the cage together with its closure plate is rendered axially slidable sufficiently to actuate the circuit-breaking means in both directions. The axial thrust of the cage is absorbed in each direction by the pressure of two springs individually adjustably compressed oppositely to each other. These springs do not resist the axial thrust directly but do so through the medium of a swingable thrust-receiving member that is planar or plate-like and is interposed between the inner ends of the springs. Each spring is confined in a fixed chamber and normally holds an inner thrust member pressed against the inner end of the chamber. Each inner thrust member has an end portion protruding through and from the inner end portion of its chamber, and the swingable end of the swingable member is interposed between the inwardly protruding end portions of the thrust members and has its normal or zero position defined thereby. The swingable member is swingably supported at a fixed point upon the housing and has a floating link connecting it with the axially shiftable cage. The swingable member carries extension means for actuating the circuit-breaking means when overload thrust on the worm-shaft and its cage transmits through at least one of the links force great enough to activate the normally inert swingable member to swing it into circuit-breaking position.

According to one feature, the attachable casing containing the overload-responsive mechanism or assembly is a casing having a vertical flange for attachment to the housing. It is divided into a central chamber flanked with a pair of oppositely directed lateral chambers or wing portions. The central chamber houses the swingable member and links, while each of the lateral chambers houses a coil spring. The outer end of each of the three chambers is closed by a removable cover-plate. The cover-plate of each lateral chamber is a thrust-absorbing plate and carries an adjusting screw for varying the compressive force on the associated coil spring.

It is among the advantages that the knee or toggle action of the swingable member and the floating link is such that it requires only relatively small opposing load-limiting spring forces; therefore, relatively small, compact, and readily adjustable springs may be employed.

The best embodiment of the invention now known to me has been chosen as an example to describe herein for illustrative, but not limiting, purposes, since modifications obviously can be made therein so long as they do not depart from the scope of the appended claims, and their equivalents. That embodiment is illustrated in the accompanying drawings, in which—

Fig. 2 is a side view of the reducer looking at the load-limiting device.

Fig. 3 is a view of the reducer taken along line 3—3 in Fig. 2.

Fig. 4 is a top view of the reducer taken along line 4—4 in Fig. 2.

Fig. 5 is an enlarged horizontal sectional view taken along the line 5—5 through the load-limiting device in Fig. 2.

Fig. 6 is an enlarged vertical partial sectional view of the load-limiting device taken along line 6—6 of Fig. 3.

Fig. 7 is a vertical sectional view taken along the line 7—7 of Fig. 6.

Fig. 8 is a vertical sectional view similar to that of Fig. 7 although with parts drawn apart.

Figure 1:
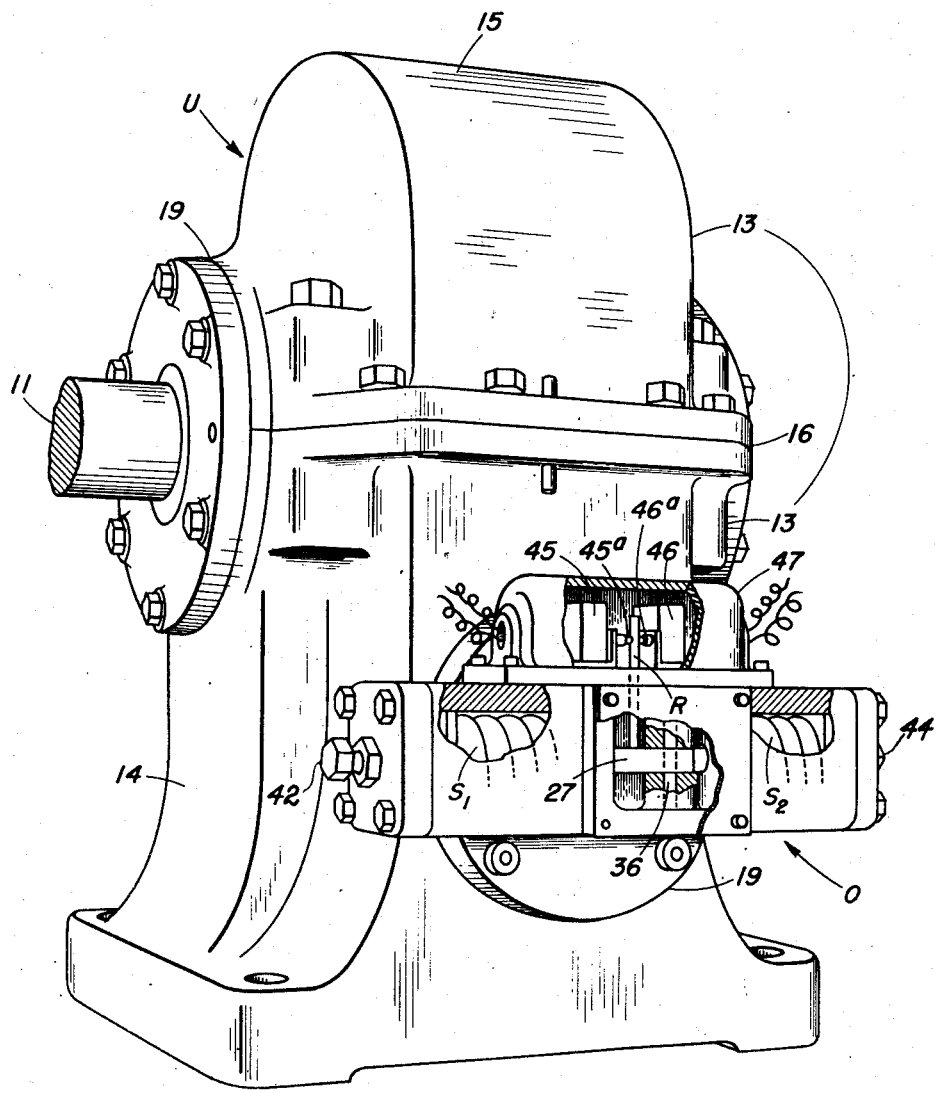
Fig. 1 is a perspective view of the speed reducer looking at the side to which the load-limiting device is attached.
Figure 9:
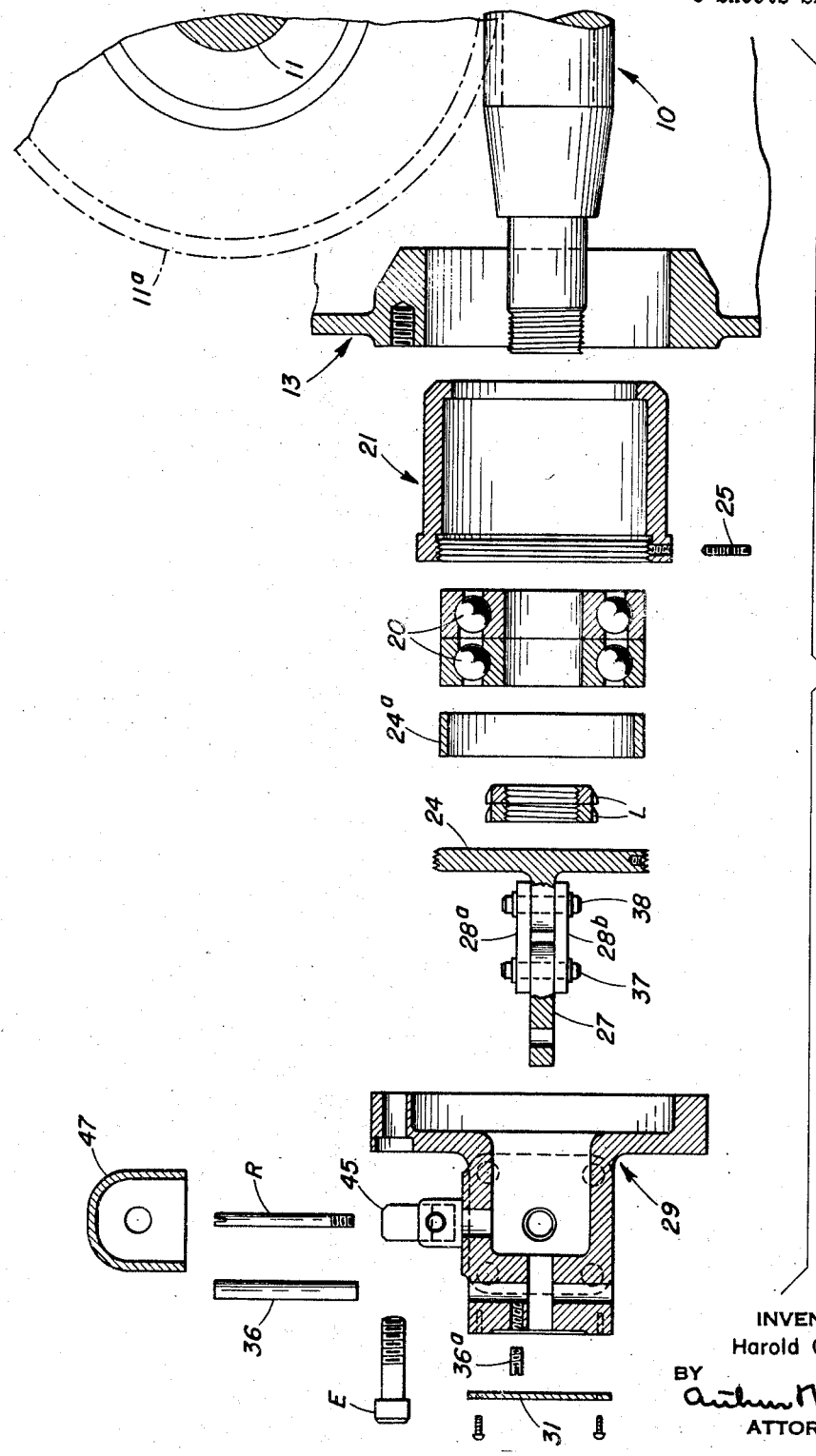
Fig. 9 is an exploded view of the load-limiting device shown in Fig. 7.

According to Figs. 1 to 4, a worm-gear speed reducer is shown that is of more or less standard construction comprising a worm-shaft 10 with a worm 10$^a$ which is motor-driven and is the input shaft. Worm-gear shaft 11 is the output shaft with worm-gear 11$^a$ and a gear housing 13 which in turn comprises a base portion 14 and a top cover portion 15 connected to the base portion as by a horizontal flange 16. The axes of the shafts 10 and 11 extend at right angles to each other although a distance D apart.

The worm-shaft 10 has a radial bearing 17 supporting an intermediate portion of the shaft although axially slidable. The outer end of the worm-shaft is supported by a combination radial and thrust-bearing 18 axially slidable with the shaft although against the pressure of overload-responsive springs of an overload-responsive or load-limiting device or assembly O attached to the side of the worm-gear housing as by a vertical flange connection 19.

Referring more particularly to Figs. 5 to 7, the combination journal and thrust bearing 18 comprises a twin ball-bearing 20 having a set of inner races 20$^a$ and a set of outer races 20$^b$ surrounded by and carried in a cage 21 which is axially slidable in the gear housing 13 together with the worm-shaft 10. This cage 21 comprises a cylindrical body portion 22 having at its inner end an inward constriction or shoulder 23, and at its outer end a closure plate 24 screwed into the cylindrical body 22 and secured as by screw 25. The plate 24 has an outwardly extending lug or eye 26 for connection with a swingable member 27 and a floating link 28 herein also briefly termed toggle- or knee action links 27 and 28, which constitute a part of the overload-responsive device O, presently to be described. Interposed between plate 24 and bearing 20 is a spacer 24$^a$.

The overload-responsive device O comprises a casing 29 in the nature of a casting having a central chamber 30, the outer end of which is closed by a removable cover-plate 31, and a pair of symmetrically disposed flanking chambers 32 and 33 extending laterally from the central chamber as well as having their outer ends closed by removable end plates 34 and 35 respectively, which constitute thrust-absorbing plates for the springs further to be described. The lateral chambers 32 and 33 are separated from the central chamber 30 by partition walls $W_1$ and $W_2$. The casing 29 is also formed with a vertical flange as part of the flange connection 19 whereby it is attachable to the gear housing 13 in such a manner that the outer end of the cage 21 is surrounded thereby.

The central chamber 30 houses toggle links 27 and 28. Link 27, herein termed the outer toggle link, is swingable about a pivot 36 provided in the central chamber and secured by a set screw 36$^a$ (Fig. 8). Link 28, herein termed the inner toggle link, is connected with the outer link by a pivot 37, and with the lug 26 of the cage 21 by a pivot 38. Link 28 in fact consists of a pair of links 28$^a$ and 28$^b$ having between them link 27. Because of axial thrust of the worm-shaft due to overload, that shaft may shift in one or another of two directions, thereby causing the toggle links accordingly either to collapse or to straighten out to the extent of such a shift.

The outer toggle link 27 (Fig. 5) is shaped as a triangle member having rounded corners 27$^a$, 27$^b$, and 27$^c$ of which the corner 27$^a$ may be said to represent the apex of the triangle while the corners 27$^b$ and 27$^c$ represent the base. The base corners 27$^b$ and 27$^c$ present cam faces $C_1$ and $C_2$ respectively engaging the inner thrust members 39 or 40 respectively which are guided in respective partition walls $W_1$ and $W_2$.

Lateral chamber 32 houses a compression coil spring $S_1$ which is confined between the inner thrust member 39 and the outer thrust member 41 engaged by an adjusting screw 42 threaded into the end plate 34. By turning the adjusting screw in one or another direction, the degree of compression of the spring can be adjusted accordingly. Similarly, lateral chamber 33 houses a compression coil spring $S_2$ which is confined between the inner thrust member 40 and an outer thrust member 43 engaged by an adjusting screw 44 threaded into the end plate 35. Thus, thrust members 39 and 40 are held against the ends of their respective chambers by the pressures of the respective springs $S_1$ and $S_2$, and these thrust members when so held define the central or zero position of the swingable member 27 between them, a small clearance or tolerance (not shown) being provided between the swingable member and the thrust members. When the worm-gear is running and axial thrust occurs that tends to shift the worm-shaft and thereby the cage 21 inwardly, namely in the direction of the arrow $A_1$ (Figs. 5 and 7), which thrust will tend to straighten out the toggle links by swinging the outer toggle link 27 slightly in the direction of the arrow $A_3$ and against the pressure of spring $S_1$. When the axial thrust occurs in the opposite direction tending to shift the worm-shaft and thereby the cage 21 outwardly, namely in the direction of arrow $A_2$, that thrust will tend to collapse the toggle links by swinging the outer toggle link 27 slightly in the direction of arrow $A_4$ and against the pressure of spring $S_2$. Link 27 will swing in the direction of the arrow $A_3$ due to a thrust in the direction of arrow $A_1$ (Fig. 5) or arrow $A_5$ (Fig. 3) when the worm-shaft is driven to rotate in the direction of arrow $A_6$, in case the thrust is great enough to overcome the pressure of spring $S_1$.

Link 27 will swing in the direction of the arrow $A_4$ due to thrust in the direction of arrow $A_2$ (Fig. 5) or of arrow $A_7$ (Fig. 3) when the worm-shaft is driven to rotate in the direction of arrow $A_8$, in case the thrust is great enough to overcome the pressure of spring $S_2$.

The slight angular movement of the outer toggle link 27 in either direction occurring as the result of an overload reacting from the gear shaft 11, is utilized to actuate the one or the other of a pair of push button switches 45 and 46, so-called micro-switches, which are mounted upon the casing 29 so that their push buttons 45ª and 46ª face each other as shown in Fig. 6. The switches are protected and enclosed by a shell or cover 47 fastened to the casing 29 and having openings 48 and 49 through which pass connecting wires $I_1$ and $I_2$ constituting part of a motor circuit. This circuit (which need not further be shown) is such that the opening of either the one or the other of the switches will cut the motor that drives the worm-gear unit.

In order to transmit and impart the actuating movement of outer link 27 to the switches, that link is provided with a rod R which is unitary with the link and extends therefrom in a direction at right angles to the plane of angular movement of the link. This rod, herein also called the switch actuator rod, extends to a point between the push buttons 45ª and 46ª (Fig. 6), so that it will push either the one or the other of the push buttons depending upon the direction of rotation of the worm gear, and thus stop the motor in case of overload.

Fig. 8 shows the manner in which a standard worm-gear unit is converted into one that is overload-responsive by the use of an overload-responsive device described above.

In Fig. 8ᵇ a standard unit is indicated by showing the journal-thrust bearing surrounded and supported by a cage C' (shown in dot-and-dash) which is similar to the cage 21 except that it has an outer flange F and is held fixed in place by a cover-plate T (also shown in dot-and-dash) held in place and fixed to the housing 29 as by screws E. This cover-plate has a cylindrical portion E' extending inwardly to confine the ball-bearing 20 within the cage member C'.

In order to convert the standard unit of Fig. 8ᵇ it is only necessary to remove the parts C' and T (shown in dot-and-dash) and to substitute the parts representing the overload-responsive device O of Fig. 8ª.

What is claimed is:

1. Apparatus having a motor-driven work-shaft shiftable axially upon encountering overload, circuit-breaking means associated with the motor, and an overload responsive assembly actuated by such axial shifting of the shaft, characterized by two springs having the lines in which they exert their compressive force aligned transversely of the shaft, a swingable thrust-receiving member confined between adjacent ends of the springs on which they both exert pressure in opposite directions to impose thereon spring-enforced inertia against swing thereof, a thrust-transmitting connection between the swingable member and the shaft for swinging the member against its spring-enforced inertia, and extension means supported from the swingable member for actuating the circuit-breaking means when axial shifting of the shaft transmitted to the swingable member is great enough to swing that member and its extension means into circuit-breaking position.

2. Apparatus according to claim 1, wherein the extension means comprises a pin extending at substantially right angles from the plane of swing of the swingable member.

3. Apparatus according to claim 1, wherein there are two circuit-breaking means, and the extension means is disposed between them and so that abnormal lateral swing of the swingable member actuates a respective circuit-breaking means.

4. A motor-driven speed reducer having a housing in which a power-output worm-shaft is shiftably journalled in a thrust-bearing so that upon encountering overload the shaft and bearing both shift axially, motor circuit-breaking means supported from the housing, and an overload responsive assembly actuated by axial shifting of the shaft, characterized by a cage shiftable with the thrust bearing, two springs supported from the housing having the lines in which they exert their compressive force aligned transversely of the shaft, a swingable thrust-receiving member confined between adjacent ends of the springs on which they both exert pressure in opposite directions to impose thereon spring-enforced inertia against swing thereof, a link connecting the swingable member and the cage, and extension means carried by the swingable member for actuating the circuit-breaking means when overload thrust on the shaft and its cage transmits through said link force great enough to activate the swingable member to swing it into circuit-breaking position.

5. Apparatus according to claim 4, wherein the overload-responsive assembly is enclosed in an auxiliary casing carried by the housing and provides a central compartment flanked by two lateral compartments.

6. Apparatus according to claim 4, wherein the overload-responsive assembly is enclosed in an auxiliary casing carried by the housing and provides a central compartment flanked by two lateral compartments, and in each of the lateral compartments is located one of the springs.

7. Apparatus according to claim 4, wherein the overload-responsive assembly is enclosed in an auxiliary casing carried from the housing and provides a central compartment flanked by two lateral compartments, with the swingable member being located in the central compartment and in each of the lateral compartments is located one of the springs.

8. Apparatus according to claim 4, wherein the overload-responsive assembly is enclosed in an auxiliary casing carried from the housing and provides a central compartment flanked by two communicating compartments, with the swingable member located in the central compartment and in each of the lateral compartments is located one of the springs extending to contact the swingable member in the central compartment.

9. Apparatus according to claim 4, wherein the overload-responsive assembly is enclosed in an auxiliary casing carried from the housing and provides a central compartment flanked by two communicating compartments, with the swingable member located in the central compartment and in each of the lateral compartments is located one of the springs extending to contact the swingable member in the central compartment, and means exterior of the lateral compartments for adjusting the spring in each.

10. An overload-responsive assembly attachable to a speed reducer having a motor-driven worm-shaft axially shiftable upon encountering an overload, and circuit-breaking means associated with the motor, characterized by an auxiliary casing for attachment to the speed reducer and having two springs arranged to have the lines in which they exert their compressive force aligned transversely of the shaft, a swingable thrust-receiving member confined between adjacent ends of the springs on which they both exert pressure in opposite directions to impose thereon spring-enforced inertia against swing of the member, a connection connectible with the shaft for transmitting thrust between the shaft and the swingable member, and extension means supported from the swingable member for actuating the circuit-breaking means when axial shifting of the shaft transmitted to the swingable member is great enough to swing that member and its extension from its normal position into circuit-breaking position.

11. In combination with a motor-driven gear reducer having a worm-shaft journalled in a gear housing, an overload-responsive device actuated by axial movement of the worm-shaft due to overload, characterized by an axially slidable cage for the worm-shaft surrounding an end thrust bearing that is unitary and axially slidable with the cage and with the worm-shaft, an auxiliary casing attached to the housing for jointly with the latter surrounding the outer end portion of the cage, and having a central compartment flanked by a pair of lateral compartments symmetrically extending therefrom, a pair of links in the central compartment comprising an outer link having its outer end pivotally connected to the auxiliary casing and an inner link pivotally connected to the cage so that the outer link performs a simple swinging movement relative to the casing while the inner link performs a compound swinging movement whereby the latter floats bodily relative to the casing when the links are functioning by axial shifting movement of the cage, a coil spring confined in each of the lateral compartments disposed to have their axes extending substantially co-axial to each other as well as transversely of the axis of the worm-shaft, an axially guided thrust member confined between the inner end of each spring and the swinging end portion of the outer link so that the swinging end portion is confined between the thrust members by pressure of the springs acting against one another through the thrust members, motor cut-off switch means fixed relative to the casing, and motion-transmitting means between the outer link and the switch means for actuating the latter to cut the motor in response to axial shifting of the worm-shaft due to overload.

12. A speed reducer drive with overload-responsive device according to claim 11, in which said motion-transmitting means comprise a switch-actuating pin unitary with said outer toggle link, and extending therefrom in a direction at right angles from the plane of swinging movement thereof.

13. A worm gear drive with overload-responsive device according to claim 11, in which the switch means comprise a pair of push button switches facing each other although spaced apart, and in which said motion-transmitting means comprise a pin carried by the outer toggle link and extending therefrom in a direction at right angles to the plane of swinging movement thereof into the space between the push buttons so as to actuate either of them to cut the motor when the worm-shaft shifts either in the one or in the other direction due to overload occurring either in the one or in the other direction.

HAROLD O. KRON.

REFERENCES CITED

The following references are of record in the file of this patent:

UNITED STATES PATENTS

| Number | Name | Date |
| --- | --- | --- |
| 2,222,716 | Mageoch | Nov. 26, 1940 |